United States Patent Office 3,363,332
Patented Jan. 16, 1968

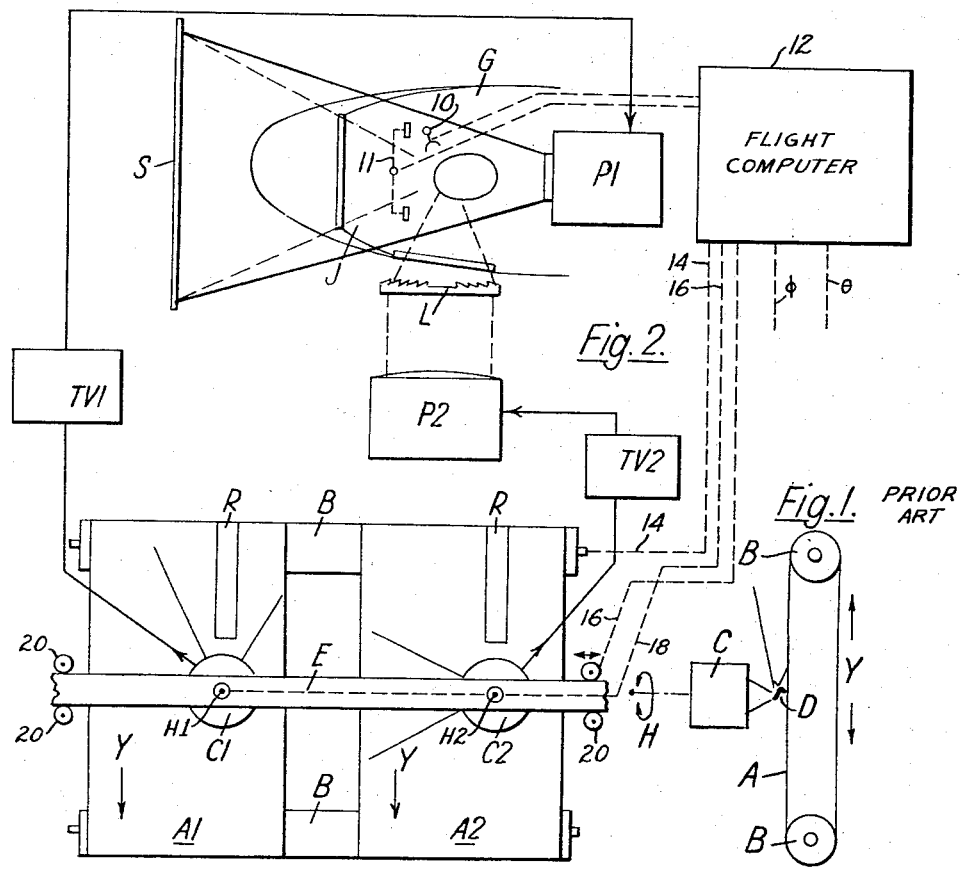
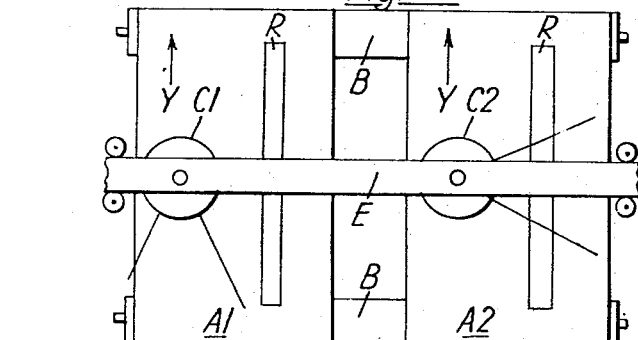
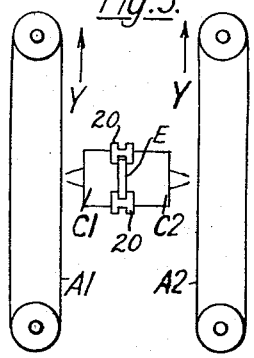
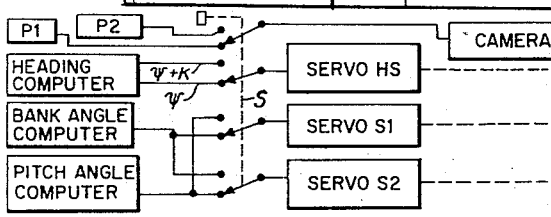

3,363,332
VISUAL FLIGHT SIMULATING SYSTEMS
William Desmond Akister and Douglas Wilson, Aylesbury, England, assignors to Redifon Air Trainers Limited
Filed Jan. 20, 1966, Ser. No. 534,945
6 Claims. (Cl. 35—12)

ABSTRACT OF THE DISCLOSURE

A simulated visual display of terrain as viewed from a moving vehicle provided by projection of images of two terrain models showing the same terrain, the image of one model being projected to simulate the view through a side window and the image of the other model being projected to simulate the view through a front window, with the images being generated in synchronism.

---

This invention relates to systems in which a television camera or equivalent viewing and image-forming device (for example a flying-spot scanner) is moved in relation to a model of an area of terrain to provide for an observer the visual illusion of travel or flight. It is particularly important in its application to systems using closed-circuit television in association with aircraft flight simulation devices, and will therefore for convenience be described in that context, although it will be evident that it can have other embodiments and practical applications.

In a typical flight simulating system, a representation of an airfield and the surrounding terrain is modelled on a vertical surface (for example a wall of a room) to a scale of the order of 1:2000. One early version of such apparatus is shown in U.S. Pat. No. 2,979,832. The camera of a closed-circuit television system is mounted with its optic axis horizontal and at right angles to the general plane of the model, and is fitted with an auxiliary optical assembly forming a periscope or optical probe which brings the entrance pupil of the camera forward to lie upon a small "viewpoint" mirror. This latter is inclined to the camera axis at an angle of the order of 45°, so that the camera looks not down upon but along the terrain model from a viewpoint which can come much closer to the terrain surface than would otherwise be practicable.

The camera is held in a carriage travelling in a gantry-on-rails arrangement which allows its viewpoint to move to any plan position in relation to the terrain, and it is also movable, in its own carriage, towards and away from the model to simulate climb and descent. These motions are effected by servomotors automatically controlled by equipment in the flight simulator.

Such a system commonly generates a rectangular picture whose width corresponds to a 50° field of view transversely, and this is presented (usually by television projection equipment) on a screen in front of the flight simulator cabin and gives the trainee occupant his view ahead changing in response to his actions. At the same time, the scene within the fixed picture frame is made to roll, and to shift both up and down and transversely, in simulation respectively of banking, pitching movements, and heading changes of the supposed aircraft in response to the trainee's handling of attitude controls, by the automatic operation of movable optical and other elements in the camera assembly.

In an alternative form of visual simulation system, the terrain is modelled on the outer face of an endless flexible band passing over upper and lower rollers, the camera locking at one of the vertical faces formed by this band. In this construction, one of the two Cartesian components of travel over the terrain is provided by motion of the band, so that the camera carriage has only to move in accordance with the other component, along a pair of rails parallel with the roller axes. Such a system is illustrated, for example, in U.S. Patent No. 2,981,008.

The functional combination above described of visual system and flight simulator enables visual flying to be practised and in particular landing approaches, touchdowns, and take-offs, using an airfield runway representation included in the model terrain.

However, limitation of the picture to a 50° view ahead of the pilot means that during curved or circling simulated approaches to landing there will be times when the runway is off to the side and no longer in view, whereas in actual flying a pilot would continue to see it, through a side window, and to use it as a visual reference in his manoeuvring of the aircraft. In this respect, therefore systems as hitherto described are inadequate for realistically practising landing approaches of this kind.

According to the invention, this deficiency is made good by duplicating the display apparatus and so disposing it as to give the observer two views in different azimuthal directions, and provision is made for the camera equipment to obtain and transmit the two corresponding views of the model terrain.

The invention is illustrated by the accompanying diagrammatic drawings, which show an example of its application to a visual flight simulating system of the kind (above mentioned) using a moving band terrain model. FIGURE 1 shows the general camera/model relationship in this type of system: the model band A passes over upper and lower rollers B, and the camera C is pointed at a vertical face of the band but has at its entrance pupil or "viewpoint" the small mirror D previously referred to, so that it looks in fact up along the model rather than vertically against it. The camera is mounted in a travelling carriage (not shown) so that it can move in an X-direction perpendicular to the plane of the drawing, and the model is movable in the Y-direction by driving one of the band rollers B. The combination of these Cartesian components of motion enables the ground track of the observer's supposed flight to be controlled, and movement of the camera in the third or Z-direction indicated varies the apparent altitude of his viewpoint D.

In addition to these linear movements, provision is made for the simulation changes referred to earlier. For example, the viewpoint mirror D may be rocked to simulate pitching of the aircraft, a Dove prism or the equivalent in the optical system of the camera may be turned to give the effect of banking, and the entire camera may be rolled in its mounting (as indicated by the arrow at H in FIGURE 1) to cause its direction of looking along the model to sweep around in simulation of heading changes. Automatic operation of these six motion components from the flight controls of the simulator are common practice in the art and do not therefore require detailed description here. Flight simulator computers which are responsive to simulated flight controls and operative to drive servomotors in accordance with simulated X and Y translations, altitude, heading, pitch angle and bank angle, are shown, for example, in U.S. Patent No. 2,591,752. In FIG. 2 a plurality of controls 10, 11 situated at the trainee station within the simulator cockpit, provide input signals to a conventional flight simulator computer apparatus 12, and servomechanism outputs from the computer are connected to the visual display apparatus in conventional fashion, the shaft output 14 serving to rotate roller B to advance the terrain model bands in accordance with the progress of the simulated aircraft in the Y direction parallel to simulated runway R, the shaft output 16 serving to move carriage bar E and cameras C1 and C2 transversely relative to the terrain model bands in accordance with simulated aircraft position in the X direction perpendicular to runway R, and the shaft output 18 serving to rotate cameras C1 and C2 about their respective axes H1 and H2 in accordance with simulated aircraft heading relative to a reference direction.

FIGURE 2 illustrates the present invention applied by duplicating the model in that two bands A1 and A2 are carried side-by-side on the rollers B, and two cameras C1 and C2 co-operate respectively with the two models, being mounted in a common carriage E for coupled motion in the X-direction. In FIG. 2 common carriage E carrying the two cameras is shown as comprising a simple rigid bar mounted to be translated transversely on rollers 20, 20 by a shaft input 16 from flight computer 12.

The arrangement is such that the camera viewpoint positions are the same in relation to the model terrain features, for example the landing runway indicated at R, and the two camera/model combinations maintain mutual correspondence and synchronism as regards the linear and angular motions. However, as regards heading, the two cameras are set with a 90° difference between them, so that if one (say C1) is regarded as providing the view ahead of the aircraft, the other C2 gives the view looking out to port. As indicated in FIGURE 2, the picture signals from the cameras are separately passed through television chanels TV1 and TV2 to the display devices P1 and P2 associated with the simulator pilot's cabin G, these devices giving pictures which are seen respectively through the front windscreen and the port side window of the cabin. In FIGURE 2, P1 is indicated as being a projector device producing an image on a viewing screen S and P2 as the monitor type having a directly-viewed cathode ray tube, but either device may in fact be of either type. The cameras will commonly have transverse fields of view of the order of 50° and the disposition of the display equipment must be such that each of the viewed pictures subtends also this angle at the observer's eye if perspective distortion is to be avoided. This will involve a blank sector of 40° between the two pictures, which can be masked by opaque canopy structure as indicated at J. In cases where it is considered important to minimise the extent of this blank sector, the arrangement may be such that the fixed difference between camera headings is appropriately less than 90°, the layout of the display equipment being correspondingly adjusted.

Since, to subtend 50° at the viewer's eye, the monitor type of display has to be relatively close to it, it may be desirable to collimate its picture (i.e., make it appear to be at infinity) by interposing the appropriate wide-angle positive lens, for example of the moulded fresnel type indicated at L.

In FIGURE 2 the duplicate camera/model assembly is shown at the setting corresponding to the aircraft about to land on the runway R. FIGURE 2A illustrates an earlier stage when the aircraft is on what is termed the downward leg of a circling approach made (as is usual) in the counter-clockwise sense, when the pilot makes use of his view of the runway through the port side window.

Consideration will show that as the two cameras are looking in directions 90° apart, control signals which produce pitching of the picture in one channel must be arranged to produce banking in the other, and vice versa; also that when the separation angle is other than 90° an appropriate "mix" of both pitch and bank signals must be applied to one or both cameras. Where the cameras are looking 90 degrees apart as shown in FIG. 2, the bank angle $\phi$ and pitch angle $\theta$ shaft outputs from the flight computer are connected, of course, to control forward-looking camera C1 in the conventional prior art manner, and to control side-looking camera C2 with the two shaft outputs interchanged, so that bank angle controls the camera C2 viewpoint mirror and pitch angle controls the camera C2 Dove prism or other image rotator.

Besides the advantage of this system in circling approaches, it has the merit of providing the simulator pilot with some peripheral or corner-of-the-eye vision of the ground going past during the final stage of a landing, which is believed to contribute to accuracy in judging the touch-down.

Physical layout and construction of the double camera/model installation may take a variety of forms. For example, there need not be a single camera mounting and long rollers B common to both bands as in FIGURE 2; the two assemblies may be separate in these respects but appropriately coupled together mechanically or electrically for joint operation in synchronism. One convenient alternative to the side-by-side layout is indicated in FIGURE 3, the two cameras being carried back-to-back in a common mounting running between two terrain models facing each other. Consideration will show that this requires one model to be made as a mirror image of the other.

It may sometimes be of advantage to have the side-view model made on a smaller scale than the other so as to provide a more extensive view in this direction. Smallness of scale involves poor apparent depth of focus when the viewpoint is very close to the ground, but this in the rapidly-moving side view is of no consequence in these circumstances. Such difference in model scale will however rule out having cameras on a common mounting; they must be separate, with their motions coupled by mechanical or electrical links which include provision for the different scale speeds.

An alternative to providing a second camera/model assembly is to arrange for a single camera to be switchable between the "view ahead" and "view to side" functions, serving in each case the appropriate one of the two display equipments, and the invention contemplates this in suitable cases. It will involve the switching in and out of a fixed-value addendum to the heading signal to the camera, and the interchange of its pitch and bank signals previously noted. Switching of function may be manually effected by an instructor, or may be made to occur automatically as successive stages in the simulated landing approach are reached. FIG. 4 illustrates such a system in schematic form. To provide the normal forward window view switch S is in the position shown, so that the camera output is applied to projector P1, the normal heading input $\psi$ is applied to servo HS, which angularly positions the camera about its H axis, the bank angle quantity $\phi$ is applied to servo S1 to control the camera image rotator and the pitch angle quantity $\theta$ is applied to control the camera viewpoint mirror. When the instructor throws switch S from the position shown, it will be seen that the camera output is instead applied to projector P2 to provide the side-window display, the heading quantity plus a constant K (where K equals 90 degrees) is instead applied to servo HS (which will result in the camera being slewed 90 degrees), and the bank angle and pitch angle inputs to servos S1 and S2 are interchanged. In such single-camera forms of the invention it may be of advantage to place the runway laterally offset from the centreline of the model so as to have the whole of the ground track in a circling approach, including the downward leg, included in a model of modest dimensions.

The invention is not restricted to the provision of only two displays; for example a third, with appropriate camera/model arrangements, may be included to provide also a view to starboard.

We claim:

1. Visual display apparatus, comprising, in combination: an observer's station including a plurality of controls; first and second projection devices for projecting to said station first and second images simulating views as seen in first and second directions, respectively from said observer's station; first and second terrain models simulating the same terrain; camera means for viewing said first and second terrain models to provide said first and second images; and means responsive to operation of said plurality of controls for synchronously translating and angularly positioning said camera means relative to said terrain models.

2. Apparatus according to claim 1 in which each of said terrain models comprises a band movable relative to said camera means, in response to operation of said plurality of controls.

3. Apparatus according to claim 1 in which said camera means comprises first and second cameras positioned to view said first and second terrain models in directions corresponding to said first and second directions, said first and second cameras being connected to provide said first and second images to said first and second projection devices, respectively.

4. Apparatus according to claim 3 in which said terrain models are constructed to the same scale and in which said first and second cameras are mechanically connected together to translate with respect to said terrain models.

5. Apparatus according to claim 4 in which said first and second terrain models are mirror images of each other and in which said first and second cameras are mounted back-to-back.

6. Visual display apparatus, comprising, in combination: an observer's station including a plurality of controls; first and second projection devices for projecting to said station first and second images simulating views as seen in first and second directions respectively from said observer's station; terrain model means to provide said first and second images; control means responsive to operation of said plurality of controls for translating and angularly positioning said camera means relative to said terrain model means; and selective switching means connected to said control means for angularly positioning said camera means in a first direction to provide said first image to said first projection device, and for angularly positioning said camera means in a second direction to provide said second image to said second projection device.

References Cited

UNITED STATES PATENTS

| | | | |
|---|---|---|---|
| 2,280,206 | 4/1942 | Waller et al. | 88—16.2 |
| 2,413,633 | 12/1946 | Jones | 35—10 |
| 2,518,419 | 8/1950 | Dehmel | 35—12 |
| 2,595,409 | 5/1952 | Reijnders | 88—16.6 |
| 2,883,763 | 4/1959 | Schaper | 35—12 |
| 2,979,832 | 4/1961 | Klemperer | 35—12 |
| 2,981,008 | 4/1961 | Davis et al. | 35—12 |

EUGENE R. CAPOZZIO, *Primary Examiner.*

R. W. WEIG, *Assistant Examiner.*